United States Patent
Duranti et al.

(10) Patent No.: US 7,729,817 B2
(45) Date of Patent: Jun. 1, 2010

(54) EMERGENCY FLIGHT PLAN

(75) Inventors: Simone Duranti, Linköping (SE); Erik Petrini, Spånga (SE)

(73) Assignee: Saab AB, Linköping (SE)

( * ) Notice: Subject to any disclaimer, the term of this patent is extended or adjusted under 35 U.S.C. 154(b) by 383 days.

(21) Appl. No.: 11/785,674

(22) Filed: Apr. 19, 2007

(65) Prior Publication Data

US 2008/0167763 A1  Jul. 10, 2008

(30) Foreign Application Priority Data

Apr. 20, 2006 (EP) .................................. 06112824

(51) Int. Cl.
*G05D 1/00* (2006.01)

(52) U.S. Cl. .............................. 701/11; 701/14; 701/23; 701/206; 701/209; 340/945; 340/952

(58) Field of Classification Search .................... 701/11, 701/23, 14, 30, 32, 206, 209; 340/945, 947, 340/952

See application file for complete search history.

(56) References Cited

U.S. PATENT DOCUMENTS

| | | | |
|---|---|---|---|
| 2003/0090382 A1* | 5/2003 | Shear | 340/574 |
| 2004/0021581 A1* | 2/2004 | Weigl | 340/945 |
| 2004/0193334 A1 | 9/2004 | Carlsson et al. | |
| 2004/0249519 A1 | 12/2004 | Frink | |

FOREIGN PATENT DOCUMENTS

JP   2005017027 A   1/2005

OTHER PUBLICATIONS

RTCA, Inc.; Software Considerations in Airborne Systems and Equipment Certification; 1992.

* cited by examiner

*Primary Examiner*—Gertrude Arthur Jeanglaud
(74) *Attorney, Agent, or Firm*—Venable LLP; Eric J. Franklin

(57) ABSTRACT

An emergency flight plan useable for an aircraft provided with a navigation system wherein the flight plan includes a pointer matrix including a number of cells. Each cell of the matrix has a unique identification and each cell corresponds to a geographical area, and wherein each cell of the matrix includes an identification of a cell corresponding to a next waypoint in an emergency route.

18 Claims, 8 Drawing Sheets

|   | A | B | C | D | E | F | G | H | I | J | K |
|---|---|---|---|---|---|---|---|---|---|---|---|
| 1 | F4 | F4 | F4 | F4 | F4 | F4 | F4 | F4 | F4 | F4 | F4 |
| 2 | F4 | F4 | F4 | F4 | F4 | F4 | F4 | F4 | F4 | F4 | F4 |
| 3 | F4 | F4 | F4 | F4 | F4 | F4 | F4 | F4 | F4 | F4 | F4 |
| 4 | F4 | F4 | F4 | F4 | F4 | F4 | F4 | F4 | F4 | K7 | K7 |
| 5 | F5 | F5 | F5 | F5 | F5 | F5 | F5 | F5 | F5 | K7 | K7 |
| 6 | C5 | C5 | C5 |    | F5 | F5 | F5 |    |    | K7 | K7 |
| 7 | C5 | C5 | C5 |    | F5 | F5 |    |    |    | K7 | K7 |
| 8 | C5 | C5 | C5 |    |    | F5 |    | F8 |    | K7 | K7 |
| 9 | C5 | C5 | C5 |    |    |    | G8 | J9 | J9 | K7 | K7 |
| 10 | C5 | C5 | C5 |    |    |    | K7 | K7 | K7 | K7 | K7 |

FIG 1i

|   | A | B | C | D | E | F | G | H | I | J | K |
|---|---|---|---|---|---|---|---|---|---|---|---|
| 1 | F4 | F4 | F4 | F4 | F4 | F4 | F4 | F4 | F4 | F4 | F4 |
| 2 | F4 | F4 | F4 | F4 | F4 | F4 | F4 | F4 | F4 | F4 | F4 |
| 3 | F4 | F4 | F4 | F4 | F4 | F4 | F4 | F4 | F4 | F4 | F4 |
| 4 | F4 | F4 | F4 | F4 | F4 | F4 | F4 | F4 | F4 | K7 | K7 |
| 5 | F5 | F5 | F5 | F5 | F5 | F5 | F5 | F5 | F5 | K7 | K7 |
| 6 | C5 | C5 | C5 |    | F5 | F5 | F5 |    |    | K7 | K7 |
| 7 | C5 | C5 | C5 |    | F5 | F5 |    |    |    | K7 | K7 |
| 8 | C5 | C5 | C5 |    |    | F5 | F8 | F8 |    | K7 | K7 |
| 9 | C5 | C5 | C5 |    |    |    | G8 | J9 | J9 | K7 | K7 |
| 10 | C5 | C5 | C5 |    |    |    |    | K7 | K7 | K7 | K7 |

FIG 1j

EMERGENCY FLIGHT PLAN

CROSS-REFERENCE TO RELATED APPLICATIONS

This application claims priority to European patent application number 06112824.5 filed 20 Apr. 2006.

FIELD OF THE INVENTION

The present invention relates to the field of vehicle navigation. More specifically it relates to termination routes for a vehicle, to be used in case of an emergency.

BACKGROUND OF THE INVENTION

In the field of architectural design of avionics systems a tactical or combat unmanned vehicle is often used for scouting, exploring terrain or the like. Unmanned vehicles of all sorts (including aerial, ground, naval and underwater vehicles) need a so-called Contingency Planning (CP), in which CP refers to interim measures to recover the unmanned vehicle following an emergency or system disruption. Contingency Planning is usually done by the operator of the vehicle off-line (i.e. before a mission) and includes all information needed by the vehicle, in case of emergencies of any sort, to be able to perform in a proper way. Contingency planning covers all degrees of freedom (capabilities) of the vehicle and is normally very complex.

A typical emergency situation is failure of the communication data links. When so, the operator is unable to communicate with the vehicle anymore. The vehicle has to take actions autonomously, i.e. decide where to go, usually based on the instructions described in the contingency planning. Other contingencies may derive from failure that prevents the vehicle to complete the mission and reach the planned mission end point, e.g. failure of the propulsion system or the like. In this case the vehicle has to plan its way to alternate locations where it can safely terminate or shut down. This type of plans can usually be set up and changed by the operator of the unmanned vehicle if the data links are up and available but have to be issued autonomously if the data links are down.

Contingency Planning is a safety critical function that must be robust, predictable, deterministic and testable. On vehicles where safety is an issue, contingency planning has to be implemented with high software criticality levels, such as "Level A" referring to the document RTCA DO-178B. RTCA DO-178B is a document drawn up by Radio Technical Commission for Aeronautics that defines the guidelines for development of aviation software. In order to keep the development costs at an acceptable level the contingency planning should be kept at a very simple level.

Document US-A1 20040249519 discloses a system that prevents the unintentional uncontrolled flight of a radio control model airplane by providing an automated programmable flight control system based upon GPS navigation. In case of loss of transmitter power the model airplane would be directed by UAV components to a predetermined safe area such as back into the pilot's normal flight way.

Patent abstract of JP-A-2005-017027 discloses a method for providing an escape guiding system. A host device receives a request for escape guidance and information on the present position from a mobile phone with GPS functionality. A disaster information database and a map information database stored in a database are searched based on the positional information to find a less dangerous route to an escape area close to the position.

US-A1-2004/0193334 relates to remote control of an unmanned aerial vehicle, UAV. It flies according to a primary route and in occurrence of an emergency the UAV is controlled to fly an alternative route and if engine failure is detected the UAV is controlled to fly to a waypoint wherein it is safe to terminate the UAV flight.

Prior art solutions however are still rather complex and mission dependent. Thus there is a need for a simple reliable rerouting plan that is mission independent.

The general object of the invention is to provide an UAV that when said vehicle has to leave a planned route or mission path due to certain emergency contingencies, the unmanned vehicle knows where to move next in order to conclude the mission in the safest way. In short, a main object of the invention is to provide an emergency flight plan that is versatile, compact and does not require much computational power to be executed.

An aspect of this object is to provide a method for emergency navigation that does not need a lot of computational resources during the execution of the method.

A further object is to be able to pre-plan different complicated routes taking into account zones where the UAV is unable or not allowed to fly etc.

Another object is to provide a method that requires none, or a minimum of communication to the unmanned aerial vehicle.

SUMMARY OF THE INVENTION

The present invention relates to methods and an emergency flight plan.

The present invention relates to an emergency flight plan useable for an aircraft provided with a navigation system wherein said flight plan comprises a pointer matrix comprising a number of cells. Each cell of said matrix has a unique identification and each cell corresponds to a geographical area and each cell of said matrix comprises an identification of a cell corresponding to a next waypoint in an emergency route.

The present invention further relates to a method for preparing an emergency flight plan of the type described above comprising the steps of; dividing a map of said geographical area into a grid forming cells; indicating identification of each cell; selecting termination points TPs in said area of interest; and determining pointers of each cell that points to a cell using the indicating identification in order to set up the emergency route wherein all the pointers forms said pointer matrix.

The present invention also discloses a method for emergency flight control using the flight plan described above comprising the steps of receiving an indication that a failure has occurred in the aircraft; determining the position of the aircraft in said geographical area, wherein said area is divided in a grid forming cells in which each is identified by a cell ID; determining the cell ID of the aircraft based on the position of the aircraft; retrieving from said cell ID of the aircraft a pointer where to direct the aircraft from said pointer matrix that corresponds to the grid of said area; and executing the directing of the unmanned vehicle to the cell ID that the pointer indicated.

The present invention further discloses an emergency travel plan useable for a vehicle provided with a navigation system, said travel plan comprises a pointer matrix comprising a number of cells wherein each cell of said matrix has a unique identification and each cell corresponds to a geographical area, and wherein each cell of said matrix comprises an identification of a cell corresponding to a next waypoint in an emergency route.

Additionally, the present invention discloses a data structure useable as a precaution plan and as an emergency flight plan onboard an aircraft were said data structure comprises a number of records, each record corresponding to a limited geographical area, and the records together covering an area of interest for an aircraft having a mission, each record capable of holding data representative an identification of a next waypoint in an emergency route.

The present invention provides a mission independent method, wherein the map of an area of interest only has to be prepared once. This map can then be used for several missions taking place in the area of interest. The method allows the preplanning of complicated routes where difficult obstacles, such as no fly zones and the like, are taken into account. The method only requires heavy computational resource usage in order to configure the matrix and conclusively the UAV does not have to perform a lot of arduous computational work during flight. As stated above, the contingency planning covers all degrees of freedom of the vehicle while the invention deals only with the spatial planning (i.e. where to fly, swim, crawl etc.).

BRIEF DESCRIPTION OF THE DRAWINGS

The invention will be described in more detail below with reference to a number of preferred embodiments and to the attached drawing, of which FIGS. 1a-1l schematically illustrates how a matrix according to the invention is produced.

DETAILED DESCRIPTIONS OF EMBODIMENTS OF THE INVENTION

Figure 1A:

Referring to FIGS. 1a-l, the present invention relates to a method of constructing a flight path matrix including pointers that direct an unmanned aerial vehicle UAV to a termination point when an emergency occurs, such emergencies may be engine failure, damages, electrical failure or the like. The method is in the following described with the aid of intermediate maps and data matrices being intermediate results when using the method. Now referring to FIG. 1a, the method initially starts by an operator preparing a flight mission operation with an unmanned aerial vehicle in the area of Linköping. FIG. 1a shows a map of the area of interest.

It should be understood that the map is per se not necessary in order to execute the invention but merely an aid in order to understand the correspondence between the cells and the geographical area. Therefore the map has been omitted from FIGS. 1c-1i. If the map is omitted memory capacity of the processing system of the UAV may be increased.

Figure 1B:
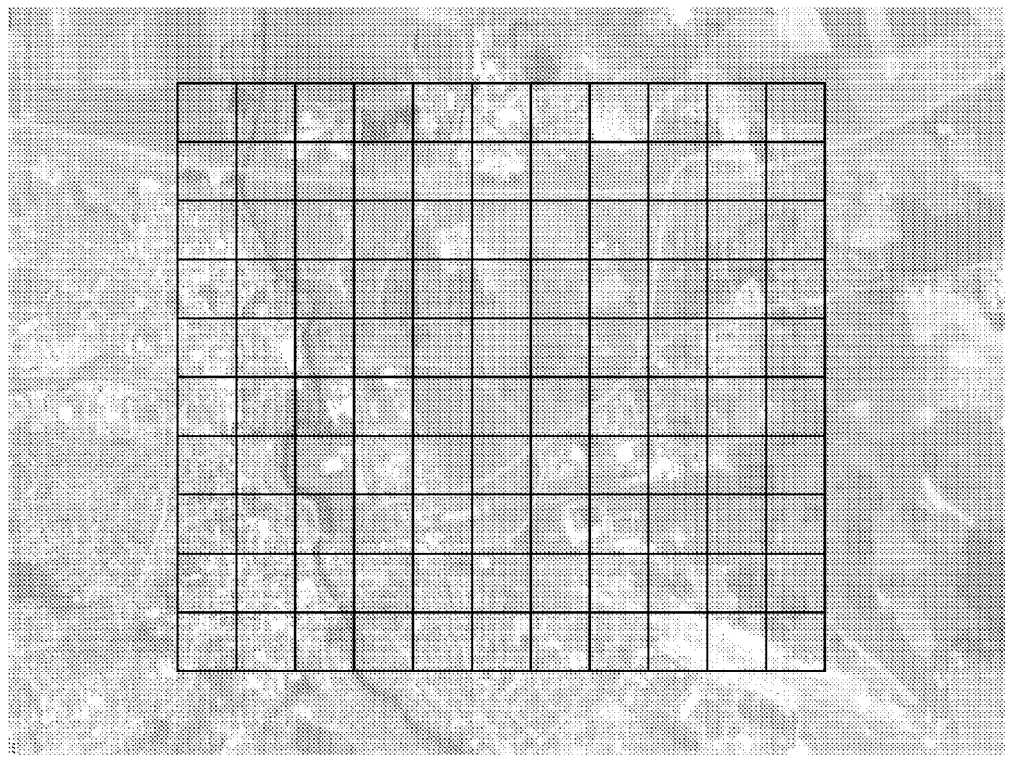
Figure 1C:
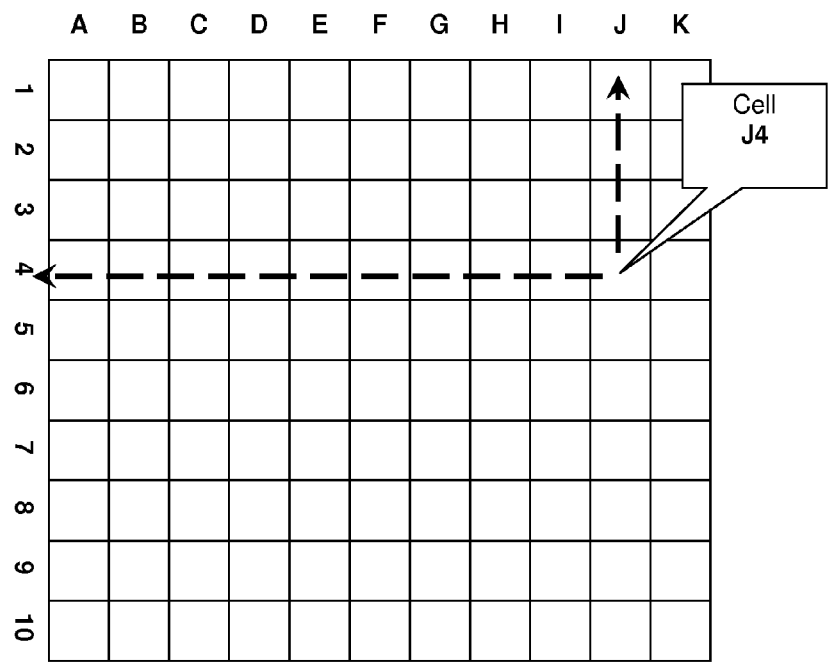
Figure 1D:
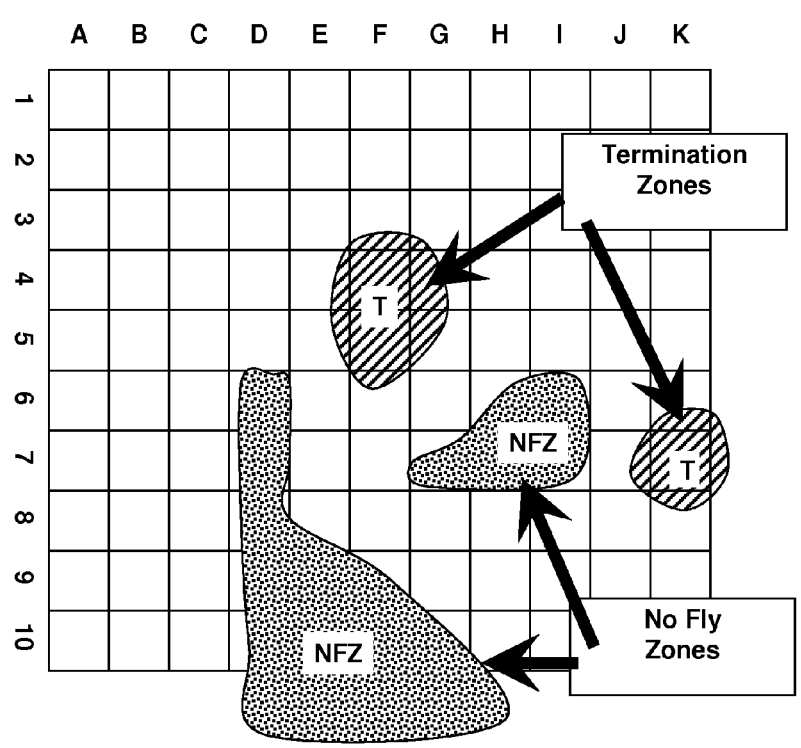
Figure 1E:
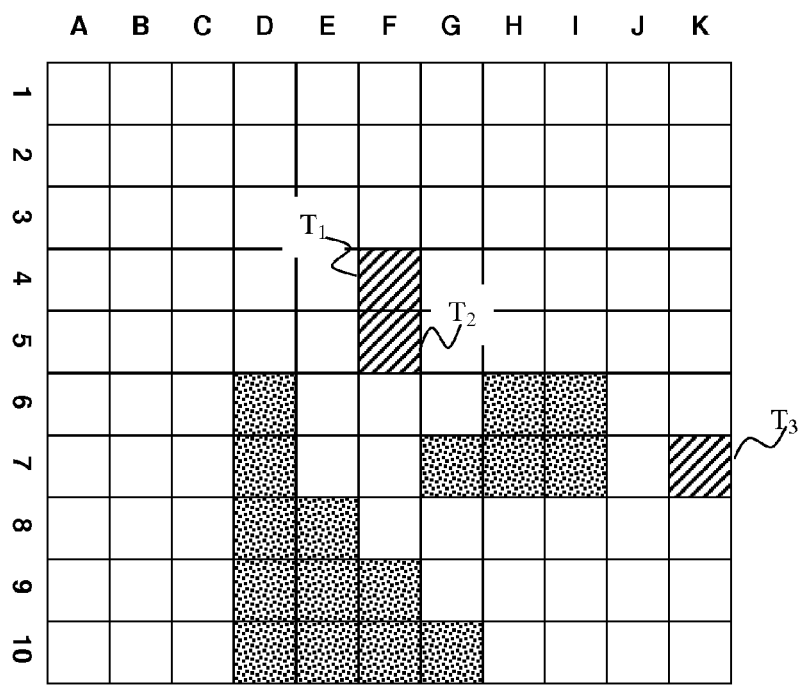

Referring to FIG. 1b, the map is divided into cells; the map is divided into cells by applying square meshed grid onto the map of the area of interest. However, the shape and size of the cells may be of any form and size. An advantage of using square cells is that an area can be represented using a single memory item, see below. The grid is used in order to identify each cell. In FIG. 1c the cells are identified using regular row-column indexes (J4). In the figure the rows (1-10) are indicated in numerical order and the columns are indicated in alphabetical order (A-K). However, any kind of identification indication may be used in order to identify a cell just as long as the cell receives a unique ID. Referring to FIG. 1d, the operator has determined and marked on the map the cells where an UAV should terminate, i.e. crash, land or the like, so these cells are called termination areas T. These termination areas may be chosen based on the open vegetation, ground configuration, hidden from the surroundings, operator's preferences or the like, other examples may be areas where flights may be ended without injuring people or causing any intolerable material damages. Further does the operator determine what cells that are so called No Fly Zones NFZ. These NFZs are areas that the unmanned aerial vehicle may not be able to fly or where it is hazardous to fly. Such areas include open electrical/telephone lines, open areas in general when the unmanned aerial vehicle wants to stay unseen, buildings where the UAV can not pass, terrain where the UAV can not pass or the like. The terrain may even be of more importance when using the invention in a land vehicle or a submerged vehicle. The NFZs are determined by the operator and are marked in the grid of the map. It should be understood that the determination of the T and NFZ areas may in other embodiments be made by computation basing the process/calculation on the ground configuration as well as operators entered values. Referring to FIG. 1e, the identified cells $T_1$-$T_3$ and NFZs are made discrete in order to match the discrete representation of the ground, e.g. a cell that is partially or slightly marked as a NFZ is fully indicated as a NFZ. However, a termination area T is only indicated as a T-cell if the cell is fully marked as a termination cell.

Figure 1F:
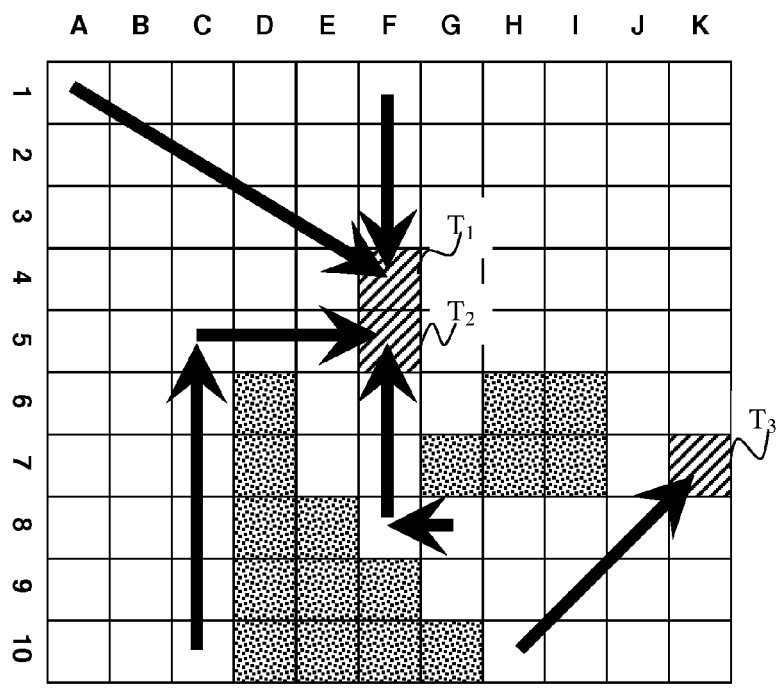

Depending on the position of the UAV when the failure occurs it is possible to plan a route, i.e. a sequence of cells that are identified by their unique IDs, which leads the UAV to the closest termination area T. In FIG. 1f it is shown how different cells point to different cells/termination areas $T_1$-$T_3$, e.g. cell A1 points directly to F4 due to the fact that no NFZ is located between the cell A1 and the termination point F4. The same applies for the cell F1 and the cell H10, which cells point directly on termination area K7 in order to indicate where the UAV should terminate during an emergency failure. The distance between the different termination areas should be short enough so that the UAV may be able to reach one of the termination areas when a failure occurs between the termination areas. When a failure occurs in e.g. cell G8 the cell G8 can not point directly to a termination point due to the NFZs between the point of failure and the termination point, instead the cell G8 point to a intermediate way point to avoid the NFZs. In the example the cell G8 points to cell F8 that point to the termination point F5, in FIG. 1f also the example of C10 pointing to C5 that further points to termination point F5 is illustrated. These paths may in one embodiment be produced by hand, e.g. an operator that selects the pointers or may in another embodiment be calculated with an automatic path-planning technique, not shown, and is probably best used when the grid is really fine meshed and the map is rather complex in the configuration.

The determination of which termination point T the cell should point to may be done using a closest route algorithm working in an iterative manner, e.g. a termination point $T_1$ is chosen as a starting point and adjacent cells are computed to point to said $T_1$. This determination is done to all the cells of the grid, not being a selected NFZ, resulting in that all cells either directly or through intermediate cells point to $T_1$. This process is then repeatedly executed for the next termination point $T_2$ and the result from this process is compared to the previously executed computation result and the pointer that points to the termination point which generates the pointer with the shortest route is determined to be the pointer of that cell. In the illustrated example further computation based from termination point $T_3$ is executed and compared with previously results.

Figures 1G, 1H:
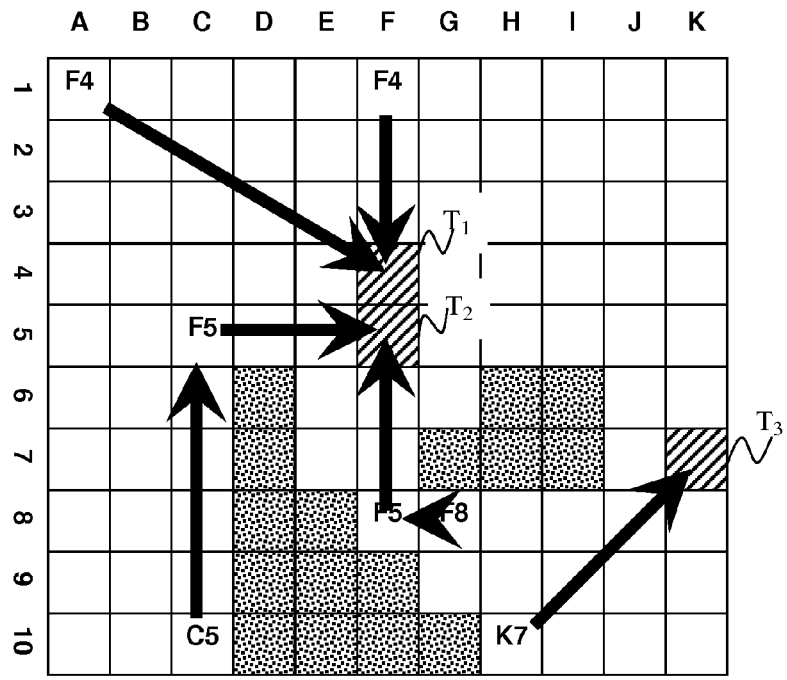

The main focus of the invention is to assign only one target point to each cell, wherein the target point may be an intermediate point or a termination point. The termination points are indicating themselves as a termination point. As disclosed in FIG. 1g the pointers of the different cells have been set with indexes that identifies the cells the pointer are pointing to. In FIG. 1h all cells that is allowable to fly over have an index that identifies a next waypoint in an emergency route. In FIG. 1i an emergency route is highlighted from the cell G9, wherein termination route contains indexes that sequentially generates a termination route, e.g. G8-F8-F5. When all the cells are provided with a certain pointer a pointer matrix as disclosed in FIG. 1l is configured and may be used in different flight missions over the area disclosed in FIG. 1a.

Figure 2:
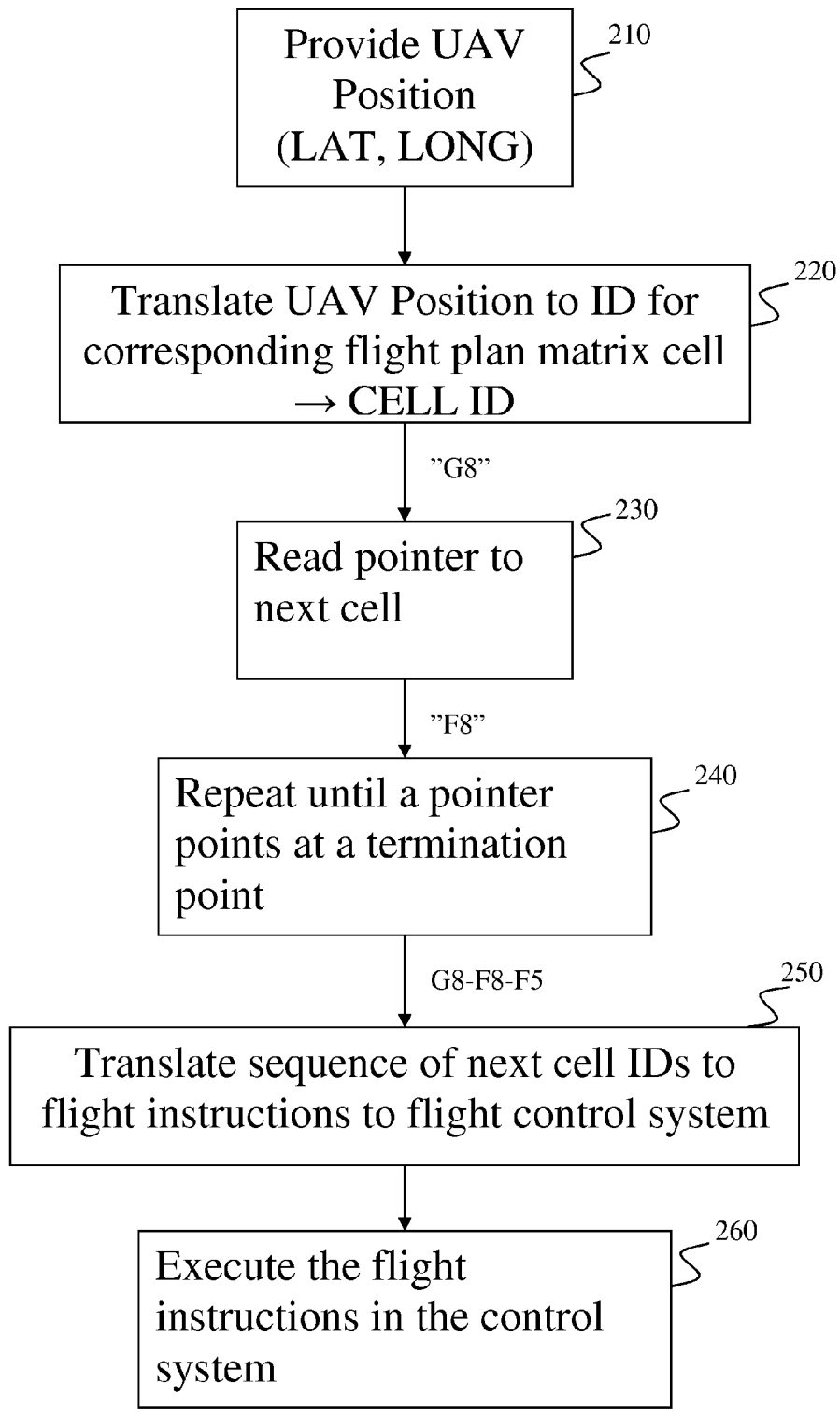
FIG. 2 shows a block diagram of a method according to an embodiment of the invention.

Referring to FIG. 2, an unmanned aerial vehicle is flying over an area of interest according to a predetermined path. Suddenly, an engine failure of the UAV occurs and from a positioning system of the UAV, such as GPS, INS or the like, the latitude as well as the longitude of the UAV of the emergency situation is received and read indicated at 210. In step 220 the data of latitude and longitude is translated to a cell ID corresponding to a flight plan matrix cell. In the example of the embodiment illustrated in the FIG. 2 the cell ID is determined to be G8. Read from a pointer matrix of the area of interest the pointer of cell G8 points to waypoint F8, as stated in step 230. In step 240 the reading of pointers of the pointer matrix is repeated until a pointer points at a termination point which may be determined if the pointer is pointing at itself. In the illustrated embodiment cell F8 further points to F5 which is indicated as a termination point as it points to itself. In step 250 the sequence or if it is just one index, occurs when the emergency situation occurs in a cell which is a termination point, is translated into flight instructions to the flight control system of the vehicle. This translation may be performed in a normal manner such as calculating a course to steer from the current position, known from the latitude and longitude of the vehicle at the emergency situation as stated above, to the pointed cell position, the latitude and longitude of the centre of said cell provided from a map or the like. Conclusively, the control system of the UAV executes and directs the vehicle in order to terminate at the desired location F5 indicated at 260.

Figure 3:
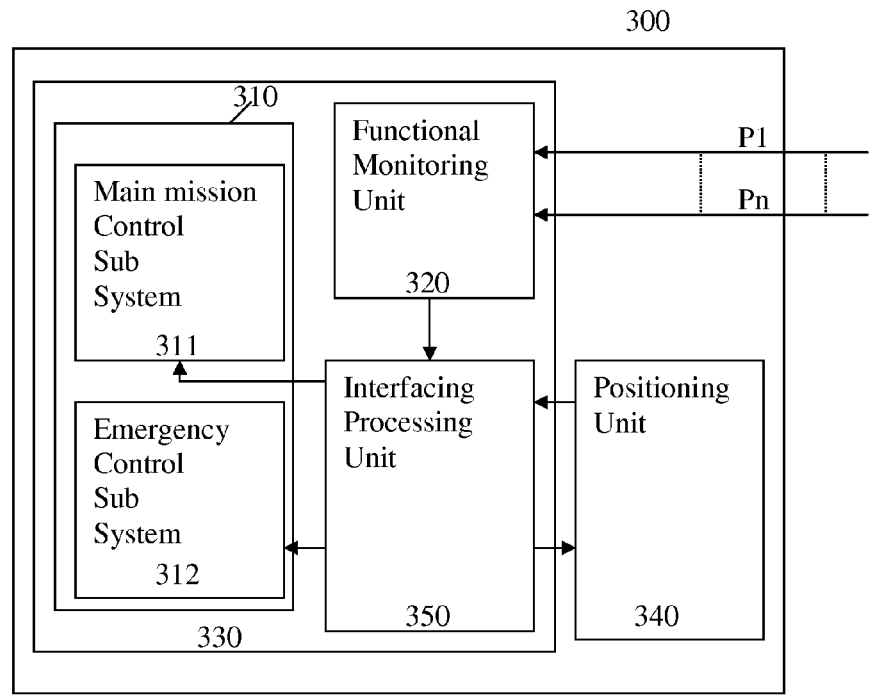
FIG. 3 schematically illustrates a signal processing system according to an embodiment of the invention.

Now referring to FIG. 3, a signal processing system 300 of an UAV is disclosed very schematically which system includes a central processing unit CPU 330 and a positioning unit 340. The CPU includes an on-board flight control system 310, a functional monitoring system 320 and an interfacing processing unit 350. The on-board flight control system 310 contains a main mission control sub system 311 and an emergency control sub system. The main mission control sub system 311 is adapted to control the vehicle to fly according to a primary route set up by an operator and preferably stored in the sub system 311. Correspondingly, the emergency control sub-system 312 is adapted to control the vehicle to fly according to an emergency route, however in accordance with commands received from the interfacing processing unit 350 as described below.

The functional monitoring system 320 is monitoring a set of flight control parameters indicated in the FIG. 3 as P1-Pn. When these parameters falls outside an acceptable range the functional monitoring system determines that a failure has occurred, such failures may be engine failure, electrical problem or the like. The functional monitoring system sets a relevant major alarm condition. When a relevant major alarm condition is received in the interfacing processing unit 350 from the functional monitoring system 320 the interfacing processing unit 350 controls the positioning data determined in the positioning unit 340 using GPS technique, Inertial navigation system or the like. The latitude and longitude is received in the interfacing processing unit 350 and the cell ID is computed from the latitude and the longitude of the UAV. A pointer matrix containing pointers is stored in the interfacing processing unit or in a separate memory of the CPU from the cell ID that has been computed a termination route can be provided using the pointer matrix as disclosed above. From what the pointer matrix discloses flight commands are transferred to the emergency control sub system in order to direct the UAV to a predetermined termination point. It should be understood that the matrix may be different due to what failure that the functional monitoring system 320 reports. In one embodiment one matrix is used for engine failure while when the failure being in the electrical system then a matrix is used pointing to termination points with longer travelling distances. This is merely examples and the amount of matrices that may be stored in the control signalling system of the UAV is only limited to memory requirements.

Figure 4:
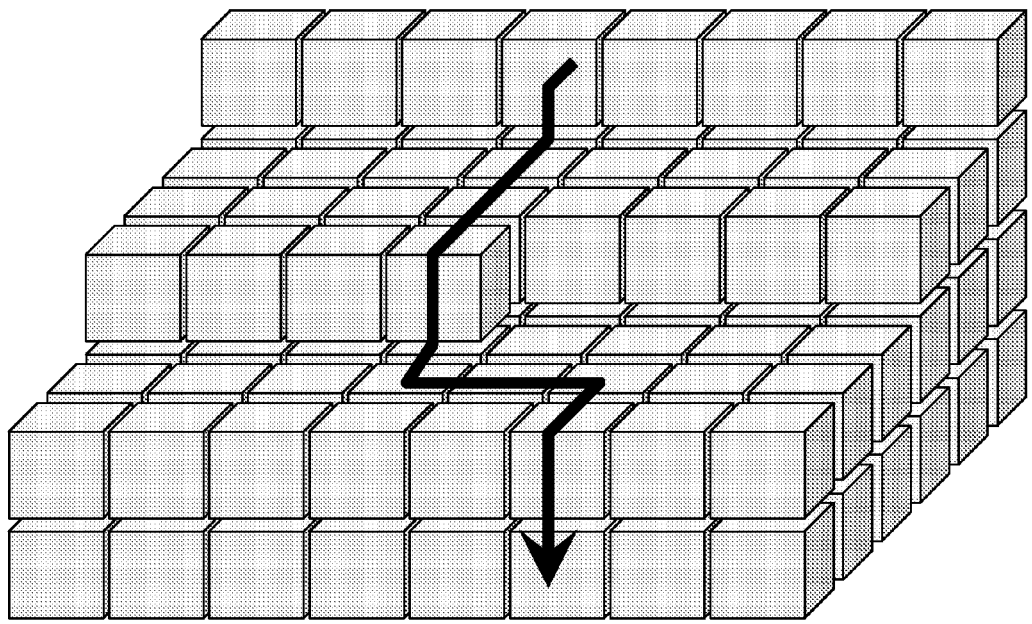
FIG. 4 discloses schematically a 3-dimensional flight-path matrix produced according to an embodiment of the present invention.

Referring to FIG. 4, the present invention according to another embodiment discloses a method wherein the map is configured as a 3-dimensional cell map in order to implement altitude as a flight parameter as well. This 3 dimensional cell map is also very useful when the unmanned vehicle is a ground vehicle as well a submerged under water vehicle. The invention functions as described above with the difference that the cells are point in depth direction as well, this results in a three dimensional matrix that is a little bit more complex than the one used in the two dimensional case. However, the invention using the three dimensional matrix is per se not complex and very useful in order to prove alternate termination paths or routes to unmanned vehicle being in distress.

Figure 5:
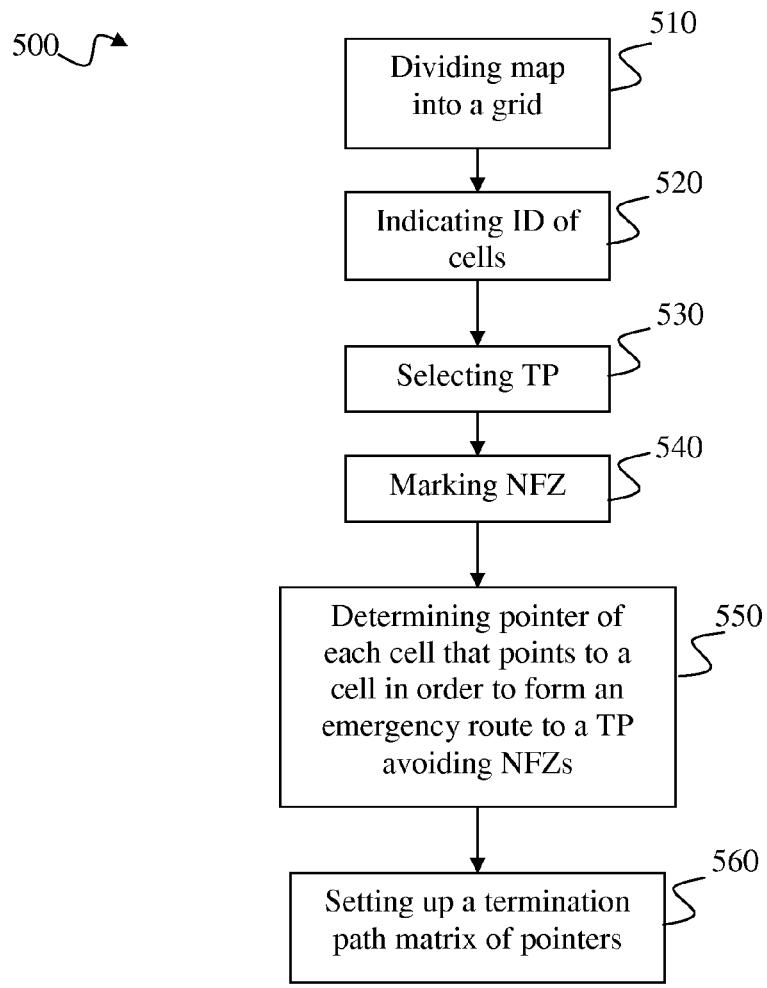
FIG. 5 is a flow diagram illustrating a method of making a matrix according to an embodiment of the invention.

Now referring to FIG. 5, an embodiment of the invention of creating a termination path matrix of pointers is shown and generally indicated as 500. In step 51 an area of interest, represented by a map or the like, is divided by a grid in order to form cells of the area of interest. As stated above the grid structure may be 2-dimensional or three dimensional. In step 520 the cells that were formed in step 510 are identified by indicating an ID of each cell, in the example above the cells are indicated with reference to columns and rows but any way of identifying cells in a grid may be employed. In step 530 of the illustrated embodiment an operator selects termination points TP based on selected preferences, such as open vegetation, ground configuration, hidden from the surroundings, not a populated area or the like. The selection of TPs may be made manually or computed using a number of parameters such as the mentioned selected preferences. In step 540 the operator determines and marks zones of cells or single cells where an unmanned vehicle is not allowed or wanted to pass, move through, fly through or the like, a so called Non Flying Zone, NFZ. The marking may be based on the populated areas, buildings, mountains or the like, where it is either not possible to pass or where it is not wanted to let the unmanned vehicle to move through the cells. In step 550 a pointer is determined for each of the divided cells, the pointer indicates where a vehicle in the cell should move. The pointer either points directly to a termination point TP or to an intermediate cell in order to avoid NFZs. This may result in a termination path consisting of a plurality of intermediate cells, a chain of cells, sequentially pointing to one another and ending at a termination point. The pointer in the illustrated example in FIG. 1 is the index indicating the identification of the cell where to move, such as the row-column index or the like. This is done for each cell of the divided map. In step 560, when all the cells have been processed, a pointer matrix is set up using all the pointers of each cell as also shown in FIG. 1*j*.

Conclusively, the present invention relates to the emergency flight path to the position of the UAV, in a recurrent way, as follows;

The spatial configuration domain of the vehicle, the sky for an UAV, the sea for an underwater system and so on, is divided in to cells of proper dimension. The cells may be 2-dimensional (columns) or 3-dimensional (cubes).

Each cell is identified by its unique ID, number, symbol or the like.

Each cell has an associated pointer that points to another cell. This pointer may be different from what emergency that has occurred, e.g. one for "communication lost", one for "engine failure and the like. The pointer indicates to which cell the vehicle has to move next.

All pointers compose a matrix, 2-dimensional or 3-dimensional. There is one matrix for each emergency case of interest. The matrices contain all information necessary to handle the contingencies. The matrices is preferably generated off-line, before the mission, only once for a certain area. No mission specific action is required by the operator.

In a further preferred embodiment a data structure is provided useable as a precaution plan and as an emergency flight plan onboard an aircraft were said data structure comprises a number of records, each record corresponding to a limited geographical area, and the records together covering an area of interest for an aircraft having a mission, each record capable of holding data representative an identification of a next waypoint in an emergency route. The emergency route terminates in a record corresponding to a termination point and the emergency route comprises at least one record corresponding to an intermediate waypoint in order to avoid that the emergency route passes through records that are not allowable to fly through.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. An emergency flight plan useable for an aircraft provided with a navigation system, said flight plan comprising:
a pointer matrix comprising a number of cells wherein each cell of said matrix has a unique identification and each cell corresponds to a geographical area, and wherein each cell of said matrix comprises an identification of a cell corresponding to a next waypoint in an emergency route.

2. The emergency flight plan according to claim 1, wherein the emergency route terminates in a cell corresponding to a termination point.

3. The emergency flight plan according to claim 2, wherein the emergency route comprises at least one cell corresponding to an intermediate waypoint in order to avoid that the emergency route passes through cells that are not allowable to fly through.

4. The emergency flight plan according to claim 1, wherein the pointer matrix is of 2-dimensional structure.

5. The emergency flight plan according to claim 1, wherein the pointer matrix is of 3-dimensional structure.

6. A method for preparing an emergency flight plan for an aircraft, the method comprising:
dividing a map of a geographical area into a grid forming cells;
indicating identification of each cell;
selecting termination points in an area of interest; and
determining pointers of each cell that points to a cell using the indicating identification in order to set up an emergency route wherein all the pointers form said pointer matrix.

7. The method for preparing an emergency flight plan according to claim 6, further comprising:
selecting and marking cells where the aircraft is not allowed or able to move through.

8. The method for preparing an emergency flight plan according to claim 7, wherein determining pointers comprises avoiding pointing to a cell that would cause the aircraft to fly over cells that are marked as unallowable or unable to move through.

9. The method for preparing an emergency flight plan according to claim 6, wherein determining pointers includes determining pointers that point directly to a termination point.

10. A method for emergency flight control of an aircraft, the method comprising:
receiving an indication that a failure has occurred in the aircraft;
determining a position of the aircraft in a geographical area, wherein said area is divided in a grid forming cells in which each is identified by a cell ID;
determining the cell ID of the aircraft based on the position of the aircraft;
retrieving from said cell ID of the aircraft a pointer where to direct the aircraft from said pointer matrix that corresponds to the grid of said area; and
directing the aircraft to the cell ID that the pointer indicated.

11. The method according to claim 10, wherein comparing the cell ID in order to receive a pointer, the pointer comprises a chain of cell IDs forming the emergency route.

12. The method according to claim 11, wherein directing the aircraft comprises directing the aircraft according to the chain of cell IDs sequentially.

13. The method according to claim 10, further comprising:
terminating the aircraft when the aircraft has arrived at the cell being a termination point.

14. The method according to claim 10, wherein the pointer matrix is configured in beforehand and bases its pointers on the geographical area and wherein the pointers either point to a termination point or a intermediate point.

15. The method according to claim 10, further comprising:
selecting a matrix of pointers based on indications on what failure has occurred in the aircraft.

16. The method according to claim 10, wherein the grid structure of the area of interest is two-dimensional.

17. The method according to claim 10, wherein the grid structure of the area of interest is three-dimensional.

18. An emergency travel plan useable for a vehicle provided with a navigation system, the travel plan comprising:
a pointer matrix comprising a number of cells wherein each cell of said matrix has a unique identification and each cell corresponds to a geographical area, and wherein each cell of said matrix comprises an identification of a cell corresponding to a next waypoint in an emergency route.

* * * * *